Dec. 1, 1970    H. BIENENFELD    3,544,204
ADJUSTABLE TEMPLE FOR SAFETY SPECTACLES
Filed June 12, 1969    2 Sheets-Sheet 1

INVENTOR.
HAROLD BIENENFELD
BY Rauber & Lazar
ATTORNEYS

INVENTOR.
HAROLD BIENENFELD
BY
Rauber & Lazar
ATTORNEYS

United States Patent Office 3,544,204
Patented Dec. 1, 1970

3,544,204
ADJUSTABLE TEMPLE FOR SAFETY SPECTACLES
Harold Bienenfeld, Forest Hills, N.Y., assignor to Glendale Optical Company, Inc., Woodbury, N.Y., a corporation of New York
Continuation-in-part of application Ser. No. 703,486, Feb. 6, 1968. This application June 12, 1969, Ser. No. 834,238
Int. Cl. G02c 5/20
U.S. Cl. 351—118                 1 Claim

ABSTRACT OF THE DISCLOSURE

Safety spectacles for industrial use and the like having adjustable temple members consisting of an ear-piece portion that telescopes into the body portion of the temple. A series of transverse recesses provided in the ear-piece portion are engageable by a proturberance resiliently pressed into a selected one of the recesses. The protuberance is carried on a resilient clamp or clasp arranged to engage each of the recesses in sequence as the ear-piece portion is adjustably moved into telescoping movement with respect to the body portion.

BACKGROUND OF THE INVENTION

Field of the invention

This invention relates to safety spectacles and more particularly to a new and useful improvement in the temple portions thereof provided for adjustable length.

Description of the prior art

Safety glasses or spectacles are widely used in industrial plants and are provided to employees engaged in work which would normally be hazardous to the eyes. In larger industrial organizations employing a large number of employees who use such glasses, it is necessary to maintain a large stock of a variety of glasses of different sizes. It has been found that most of the glasses differ only in length of the temples. Nevertheless such stock has been necessary in order to satisfy the immediate fitting of any employee.

In order to reduce the substantial investment that is needed for a large variety of glass sizes, adjustable temple devices have been developed and used with more or less degrees of satisfaction. Even the better type of spectacles, however, have been found to be bulky, difficult to adjust, complex and unreliable in maintaining the adjusted position. It is the general objective of this invention, therefore, to provide spectacles having improved positive adjustable temples of strength and obviating the need of tools for adjustment.

SUMMARY OF THE INVENTION

The spectacles of the invention comprise a two-piece temple, the body or main portion of which being pivotally connected to the frame of the spectacles and having a hollow rectangular cross-section tubular portion for receiving in telescoping action an ear-piece portion. The ear-piece is provided with a series of transverse recesses in the form of slots or grooves of sufficient depth to receive a protuberance such as a lug to prevent thereby relative longitudinal movement. The lug is carried on a spring clip attached to the body portion of the temple. The clip is of sufficient strength to maintain the lug in a groove when positioned therein and yet resilient enough to allow a user to easily displace the lug from one groove when desired to readjust or change the length of the temple.

BRIEF DESCRIPTION OF THE DRAWING

Referring now to the drawing which shall be described in association with the following description.

DESCRIPTION OF A PREFERRED EMBODIMENT

Figure 1:
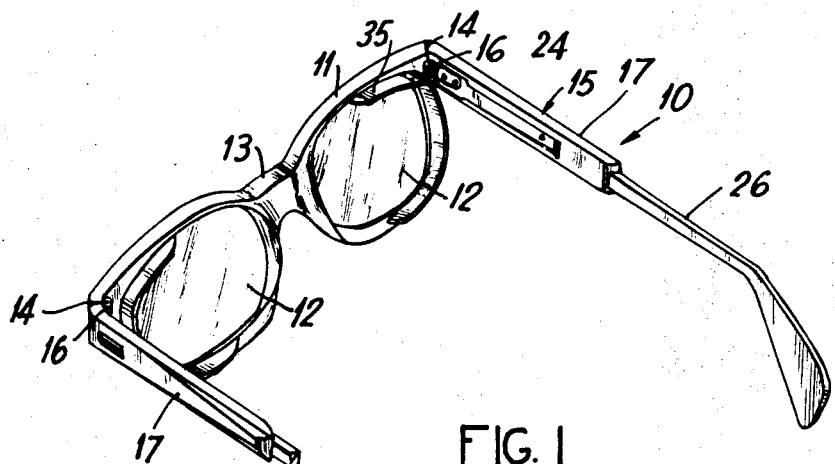
FIG. 1 is a perspective view of the spectacles provided with the adjustable temples of the invention.

Referring now to the drawing, the spectacles 10 comprise a frame 11 provided with rims for holding the lenses 12 and includes a bridge 13. A pair of temples 15 are pivotally attached to the frame 11 at the temporal region 14 of the frame by means of hinges 16. The hinge 16 is preferably of the more conventional barrel-type comprising a portion mounted on the frame, a mating portion mounted on the temple and pivotally secured to each other by a pin extending through the interleaved mating ends.

Figure 2:
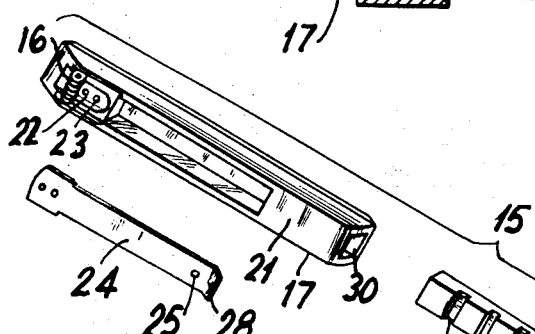
FIG. 2 is an exploded view of a temple showing the body portion and the ear-piece portion in extended position.
Figure 4:
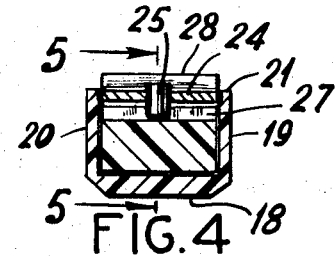
FIG. 4 is a transverse sectional view of the temple as seen along lines 4—4 of FIG. 3.
Figure 3:
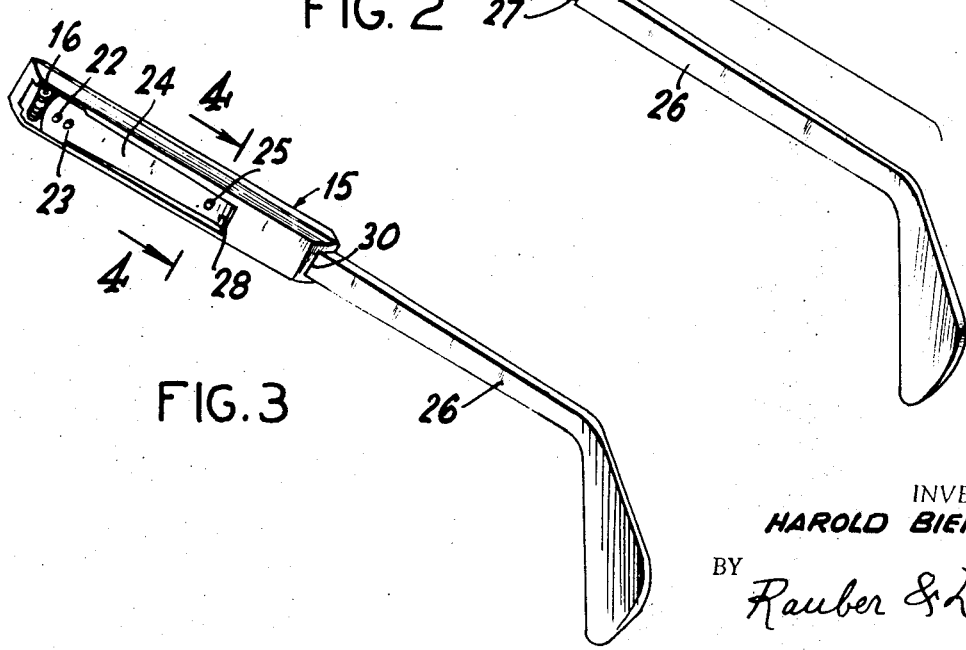
FIG. 3 is an assembled view in perspective of the temple.

The temple romprises two main portions, as shown in enlarged detail in FIG. 2. The body portoin 17 is formed as a generally hollow rectangular parallelepiped open at end 30 and having a bottom wall 18 and side walls 19 and 20 (FIG. 4) extending the entire length. A relatively short top wall portion 21 covers the upper longitudinal opening from the open end 30 to a length extending inwardly about one-quarter of the total length of the structure 17. The opposite (hinge) end of the body portion 17 is substantially solid closing off the open portion and providing a foundation 40 for mounting the hinge 16. The hinge portion on the temple may be conveniently integrally formed with a mounting bracket 16a for receiving rivets 22 and 23 to hold the bracket and the hinge onto the body portion 17. A spring clip 24 is connected conveniently to the body also by the rivets 22 and 23 and extends longitudinally over the body portion substantially to cover the upper wall opening in the body portion. The end portion 28 of the clip 24 is curved upwardly to provide a means for the user to pry and lift the clip away from the body portion as, for example, by inserting the nail of the finger thereunder.

The clip 24 is located over the bracket portion 16a of the hinge 16 and is provided with a pair of holes mating the holes in bracket 16a to receive the rivets 22 and 23. Rivets 22 and 23 extend completely through the solid portion 40 of forward member 17 to establish a firm and rigid connection of the clip 24. The cantilevered mounting of the resilient clip 24 is thus capable of experiencing many repeated movements of locking the temple in fixed position as will be explained.

A lug 25 is attached to the end of the clip opposite to that at which it is attached to the body portion and preferably near the curved portion 28. The lug is of sufficient size to extend into and through the opening of the tube to press against another portion 26 of the temple about to be described.

The ear-piece portion 26 of the temple is a generally solid, rectangular, elongated piece extending into a curving flared portion for engaging the head behind the ear of the wearer of the usual shape well known in the art. It is preferably made of acetate butyrate.

The type of ear-piece shown in the drawing is conveniently known as the spatula type of temple. Alternatively, the cable type of temple may be used. The cable type is formed, for example, of a flexible core of phosphorus-bronze wound with nickel or silver and covered with plastic. The cable type of temple is popular for allowing easy adjustment and shaping of the ear portion member to conform to the head and ear of the wearer.

The temple portion 26 is provided with a series of transverse rectangular slots or grooves 27 extending in depth about one-quarter the thickness of the ear-piece portion. The portion 26 is inserted into the opening 30 of the body portion 17 until its end 29 engages the lug 25 which extends into the hollow portion of the member 17 a sufficient depth to prevent the ear-piece portion 26 from being further inserted. The spring clip 24 is lifted as by engaging the end portion 28 sufficiently to raise the lug 25 to allow the portion 26 to be inserted further within the member 17. The user selects the position or length desired by sliding the member 26 until the desired groove 27 is in approximate location under the lug 25. The clip 24 is then released causing the lug to be pressed against the surface of the member 26. By a simple movement inwardly or outwardly about that portion the member 26 will receive the lug 25 in the groove 27. The temple ear-piece member 26 is dimensioned to fit snugly within the opening of the portion 17 and will thereby be firmly maintained in position when the lug 25 is seated in the groove 27. If it becomes necessary to change the length of the temple the clip 24 is again lifted to allow the lug 25 to be disengaged from the groove so that the ear-piece member 26 may be slid inwardly or outwardly from that position to reposition another groove 27 under the lug 25.

The supporting structure of the spectacles, including the frame 11 are preferably formed of non-metallic material, such as cylonite, Celluloid, Bakelite or other resinous materials well known in the art. The lenses are made of safety glass and may be optically corrected, as desired. A semicircular shield portion 35 about the glasses provides means to prevent particles from projecting into the eye portion along paths that are above or lateral to the user.

The body portion 17 of the temple may be integrally molded and formed of resinous non-metallic material. The barrel hinge and rivets are made of metal to provide the strength and durability needed for the functions they serve. The clamp 24 is made of spring steel, nickel silver or any suitable resilient material of a strength to provide a clip that will have long and reliable wear and use.

Figure 5:
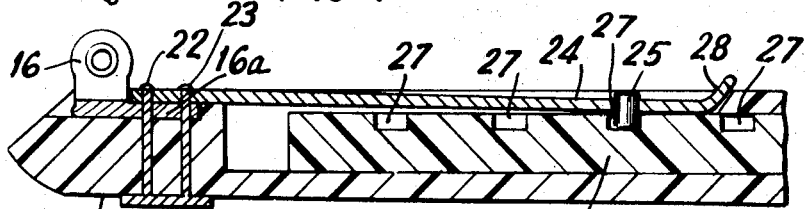
FIG. 5 is a longitudinal sectional view in side elevation as seen along lines 5—5 of FIG. 4.
Figure 6:
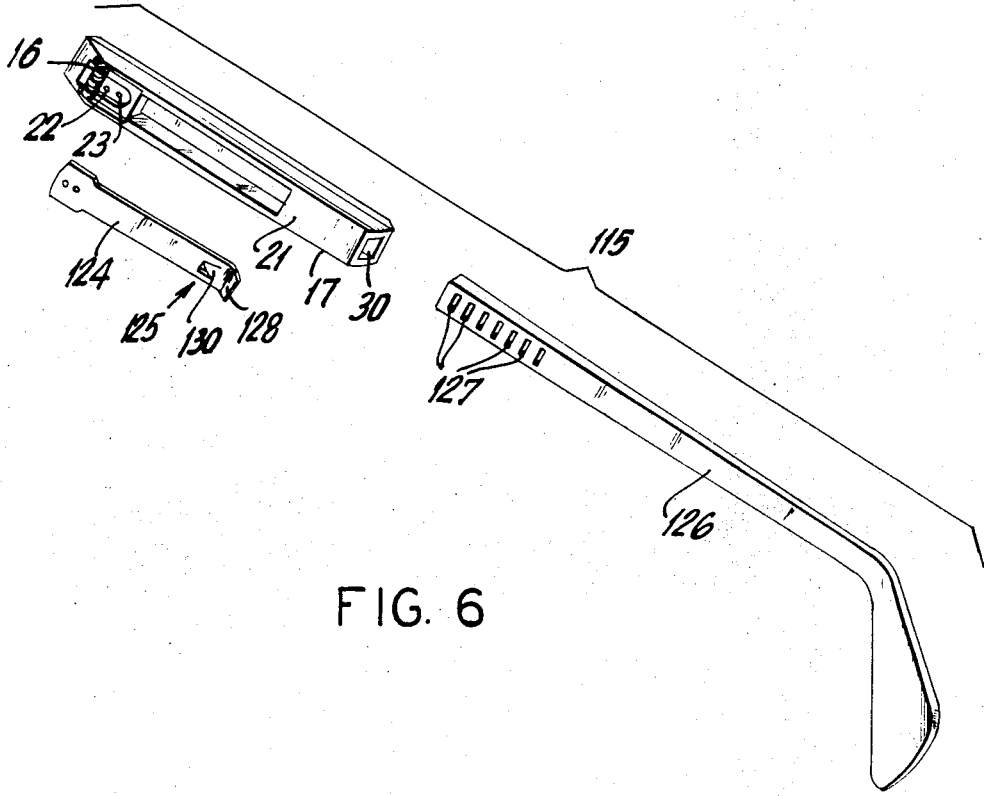
FIGS. 6 and 7 are views similar to FIGS. 2 and 5 respectively of a modified form of the invention.
Figure 7:
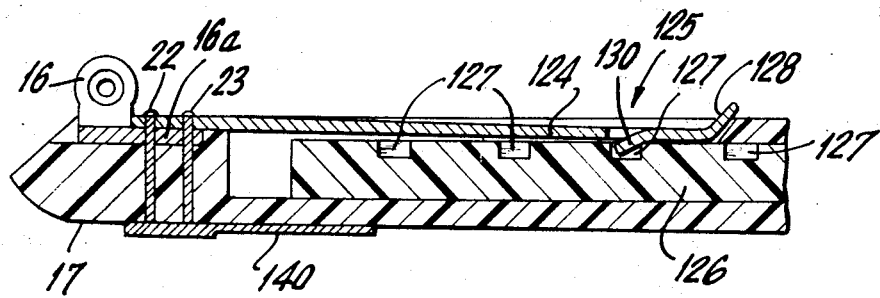

Referring now to FIGS. 6 and 7 there is shown a modified form of the invention used thereof corresponding respectively to FIGS. 2 and 5 of the form of the invention just described. The identical reference numerals on these figures refer to identical portions of corresponding parts. The modification of the invention illustrates a different form of the protuberance on the spring clip for engagement on any one of the recesses on the ear-piece.

More particularly, a modified form of clip 124 is provided with a protuberance 125 formed by stamping from the clip 124 a tongue 130 bent inwardly with respect to the body portion 17. The tongue 130 extends towards the hinge 16 so as to allow an unrestricted insertion movement of the ear-piece 126 and yet to prevent the withdrawal of same. The ear-piece 126 is in general of similar shape as that of ear piece 126 except that the recess or cavities 127 are integrally formed on the inner surface of the ear-piece 126 as shown in FIG. 6. Each recess 127 extends laterally across the inner face of the ear-piece 126 and is of sufficient depth to receive the tongue 130. FIG. 7 shows these elements in an assembled operative position.

It should be appreciated that the ear-piece 126 may be used with the form of the invention described with respect to FIGS. 1 through 5 and that the spring clip 124 just described may be used with the ear-piece 26, the grooves 27 of which being transfer slots extending completely across the face of the ear-piece.

A still further feature of the invention includes means to strengthen the overall structure of the assembly by providing an elongated reinforcing plae 140 integrally formed on the outer ends of rivets 22 and 23. Extension plate 140 is mounted in place flush against the outer face of the body portion 17. In this way any bending movements exerted on the body portion 17 directly or by forces applied to the temple 125 or 26 are absorbed by the structural strength of the plate 140. I have discovered that such a plate according to this arrangement reduces, if not virtually eliminating breakage that may occur from unusual use as by bending the temple piece assembly beyond the usual range of movement intended by the hinge 16.

It should now be apparent that I have provided a novel and improved adjustable temple for safety spectacles that is without the aid of tools easily adjustable. It should be especially noted that no screws or other similar fastening devices are needed to maintain the two-piece temple in substantially rigid position at the selected length of the user. The spring clip with its protuberance establishes a positive stop for the telescoping temple members from shortening or lengthening until desired by a positive release by the user. It is to be noted that the protuberance is arranged to register easily with any groove in the temple. Further, the arrangement reduces manufacturing costs since dimension tolerances are not critical.

Furthermore, as described, the invention allows for the use of either of the conventional types of ear-pieces. Thus the temple provides for ready interchange of a spatula-type with a cable-type ear-piece portion.

It will be especially noted that the form of the ear-piece member is such as to provide a temple of substantial strength even though the grooves are provided on the surface thereof for engaging and receiving the lug carried by the spring clip on the body of the temple.

It will be obvious to those skilled in the art that certain changes may be made in the invention without departing from the spirit and scope thereof, and, therefore, the invention is not limited by that which is specifically illustrated in the drawing and described in the specification, but only as indicated in the accompanying claim.

What is claimed is:

1. An interchangeable and length adjustable temple pivotally attached to one end of a spectacle frame,
said temple comprising a two-piece telescoping member consisting of a forward member pivotally connected to the frame and an ear-piece member adapted to engage the head of the user;
said forward member comprising a hollow, rectangular in cross-section, elongated tube having flat parallel side walls and a flat bottom wall and a top wall having an opening for a substantial distance in the middle portion of said tube,
an elongated resilient clip secured at one of its ends to said tube and extending substantially over said wall opening in spaced relation to said bottom wall and without a bridge of said forward member covering all or a portion of said clip,
said clip having a single tongue integrally formed on its surface, said tongue being formed so as to protrude from the surface of said clip and extending longitudinally toward the secured end of the clip, said clip having gripping means permitting it to be pulled outwardly from the said opening against its resilience,
said ear-piece member comprising a generally elongated solid shank portion generally rectangular in cross-section and a portion shaped for engaging the head of the wearer,
said ear-piece member having a plurality of transverse grooves extending across one face of the shank portion adapted to engage and receive said tongue when said ear-piece member is telescopically inserted into said forward member,
said tongue being releasably securable to coact with any one of said plurality of grooves to provide for longitudinal adjustment of said temple member by allowing for telescoping movement of said forward member relative to said ear-piece member when said clip is lifted clear of said grooves.

References Cited

UNITED STATES PATENTS

| | | | |
|---|---|---|---|
| 2,443,249 | 6/1948 | Jackson | 351—118 X |
| 3,304,145 | 2/1967 | Hamm | 351—140 X |
| 3,318,654 | 5/1967 | Kreuzberger et al. | 351—118 |

DAVID SCHONBERG, Primary Examiner

J. W. LEONARD, Assistant Examiner

U.S. Cl. X.R.

2—14.18; 351—140